(12) United States Patent
Rodriguez et al.

(10) Patent No.: US 10,834,029 B2
(45) Date of Patent: Nov. 10, 2020

(54) AUTOMATIC MODIFICATION OF MESSAGE SIGNATURES USING CONTEXTUAL DATA

(71) Applicant: International Business Machines Corporation, Armonk, NY (US)

(72) Inventors: Laura Janet Rodriguez, Durham, NC (US); Stephanie Huston, Raleigh, NC (US); Corville O. Allen, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 16/261,518

(22) Filed: Jan. 29, 2019

(65) Prior Publication Data

US 2020/0244606 A1    Jul. 30, 2020

(51) Int. Cl.
*H04L 12/58* (2006.01)
*G06F 16/2457* (2019.01)

(52) U.S. Cl.
CPC ........ *H04L 51/04* (2013.01); *G06F 16/24578* (2019.01); *H04L 51/16* (2013.01)

(58) Field of Classification Search
CPC .... H04L 51/04; H04L 51/16; G06F 16/24578
See application file for complete search history.

(56) References Cited

U.S. PATENT DOCUMENTS

| | | | |
|---|---|---|---|
| 9,087,323 B2 | 7/2015 | Hein et al. | |
| 9,414,779 B2 | 8/2016 | Kanevsky et al. | |
| 9,444,776 B2 | 9/2016 | Klbouyeh et al. | |
| 2011/0087969 A1* | 4/2011 | Hein | G06Q 10/107 715/752 |
| 2015/0195092 A1* | 7/2015 | Bartkiewicz | H04L 9/3247 713/176 |
| 2015/0264146 A1* | 9/2015 | Cudak | G06F 16/9535 379/142.01 |

(Continued)

OTHER PUBLICATIONS

"Automatic signature changing", MSOutlook.info, [retrieved from https://www.msoutlookinfo/question/14], May 16, 2015.

(Continued)

*Primary Examiner* — Nicholas R Taylor
*Assistant Examiner* — Sanjoy Roy
(74) *Attorney, Agent, or Firm* — North Shore Patents, P.C.; Michele Liu Baillie

(57) ABSTRACT

In automatically modifying message signatures, a system extract message content from the message text from a sender to a recipient. Using at least the message content, the system determines: a relationship context capturing a nature of the relationship between the sender and the recipient, a temporal context capturing temporal features of the message content, a historical context capturing a nature of electronic interactions between the sender and the recipient over time, and a tone category capturing a primary tone and strength of the primary tone of the message content. The system selects a signature template associated with contextual data that includes the relationship, temporal, and historical contexts and the tone category. The signature template includes a set of sections where a signature is modified by inserting section values associated with the contextual data into the set of sections. The modified signature is inserted into the message text.

14 Claims, 4 Drawing Sheets

(56) References Cited

U.S. PATENT DOCUMENTS

2015/0341299 A1* 11/2015 Albouyeh .............. G06F 16/95
 709/206
2017/0048181 A1 2/2017 Gupta
2017/0052949 A1* 2/2017 Baldwin .............. G06F 40/194
2018/0212908 A1* 7/2018 Knudson .............. G06F 40/295

OTHER PUBLICATIONS

"Change Outlook signature automatically based on From: field", Experts Exchange, LLC, [retrieved from https://www.experts-exchange.com/questions/26768602/Change-Outlook-signature-automatically-based-on-From-field.html], Jan. 25, 2011.
Bryant, Dave; "Dynamic E-mail Signatures"; The RES Story, Sep. 5, 2012.

* cited by examiner

AUTOMATIC MODIFICATION OF MESSAGE SIGNATURES USING CONTEXTUAL DATA

BACKGROUND

Digital communications, such as electronic mails, text messages, digital message boards, and online forums, allow message senders to create closings or signatures that are automatically inserted into the messages they compose. Rules may be configured by the senders to insert different signatures under different circumstances. However, such rules must be sender configured and are applied in the same manner whenever parameters in the rules are satisfied. The ability for message signatures to be varied beyond the rules is not possible or is limited.

SUMMARY

Disclosed herein is a system for automatic modification of message signatures using contextual data, and a computer program product and method as specified in the independent claims. Embodiments of the present invention are given in the dependent claims. Embodiments of the present invention can be freely combined with each other if they are not mutually exclusive.

According to an embodiment of the present invention, a system receives message text for an electronic message from a sender to a recipient and extracts message content from the message text. Using at least the message content, the system determines a relationship context for the sender and the recipient, where the relationship context capturing a nature of the relationship between the sender and the recipient. Using at least the message content, the system determines a temporal context for the message content, where the temporal context capturing temporal features of the message content. Using at least the message content and a history of electronic conversations between the user and the recipient, the system determines a historical context for the sender and the recipient, where the historical context capturing a nature of electronic interactions between the sender and the recipient over time. Using at least the message content, the system determines a tone category for the message content, where the tone category capturing a primary tone and strength of the primary tone of the message content. The system selects a signature template associated with contextual data. The contextual data includes at least the relationship context, the temporal context, the historical context, and the tone category. The signature template includes a set of sections. The system modifies a signature by inserting one or more section values associated with the contextual data into one or more of the set of sections. The modified signature is then inserted into the message text. The modified signature incorporates contextual awareness and provides a dynamically crafted and updated message signature that is the most appropriate for the message's context.

DETAILED DESCRIPTION

Figure 1:
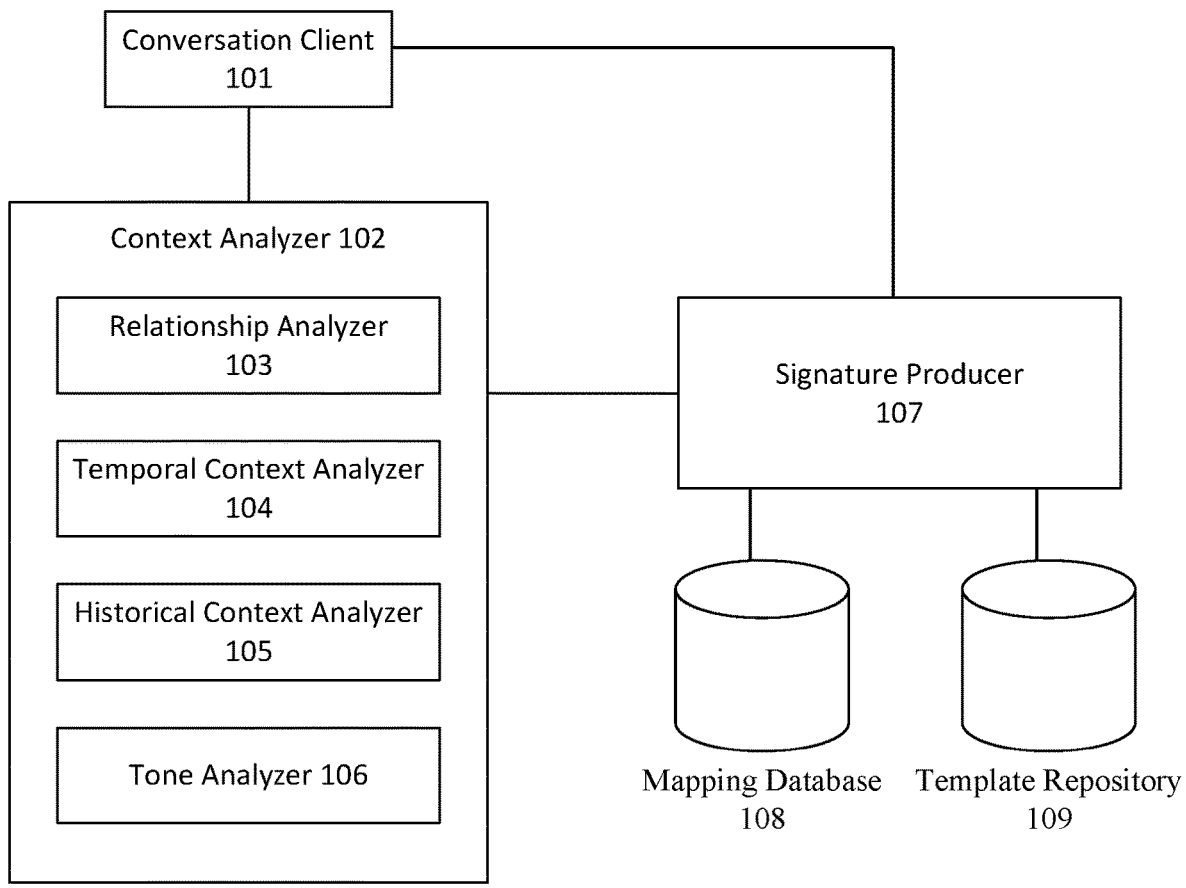
FIG. 1 illustrates a system for automatic modification of message signatures using contextual data, according to embodiments of the present invention.

FIG. 1 illustrates a system for automatic modification of message signatures using contextual data, according to embodiments of the present invention. The system includes a conversation client 101 through which a user exchanges electronic messages with other users. The conversation client 101 is coupled to a context analyzer 102, which analyzes texts of an electronic message composed by a sender to extract the message content and associated contextual data. The contextual data are extracted using the message text by a set of components, including: a relationship analyzer 103 for determining a relationship describing the nature of the relationship between a sender and a recipient of an electronic message; a temporal context analyzer 104 for determining a temporal context capturing temporal features of message content; a historical context analyzer 105 for determining a historical context capturing the nature of a history of electronic conversations between the sender and the recipient; and a tone analyzer 106 for determining a tone category capturing a primary tone and strength of the primary tone of the message content. The message content and contextual data are sent to a signature producer 107, where the contextual data includes some combination of the relationship context, the temporal context, the historical context, and the tone category. The signature producer 107 selects a signature template from a template repository 109 matching the contextual data and inserts section value(s) associated with the contextual data into one or more sections of the signature template to create a modified signature. The section values are obtained from a mapping database 108, which contains entries mapping section values to specific combinations of the contextual data. The modified signature is then sent to the conversation client 101, which inserts the modified signature into the message text. The modified signature incorporates contextual awareness and provides a dynamically crafted and updated message signature that is the most appropriate for the message's context. The context analyzer 102, the plurality of components 103-106, and the signature producer 107 are described further below.

Figure 2:
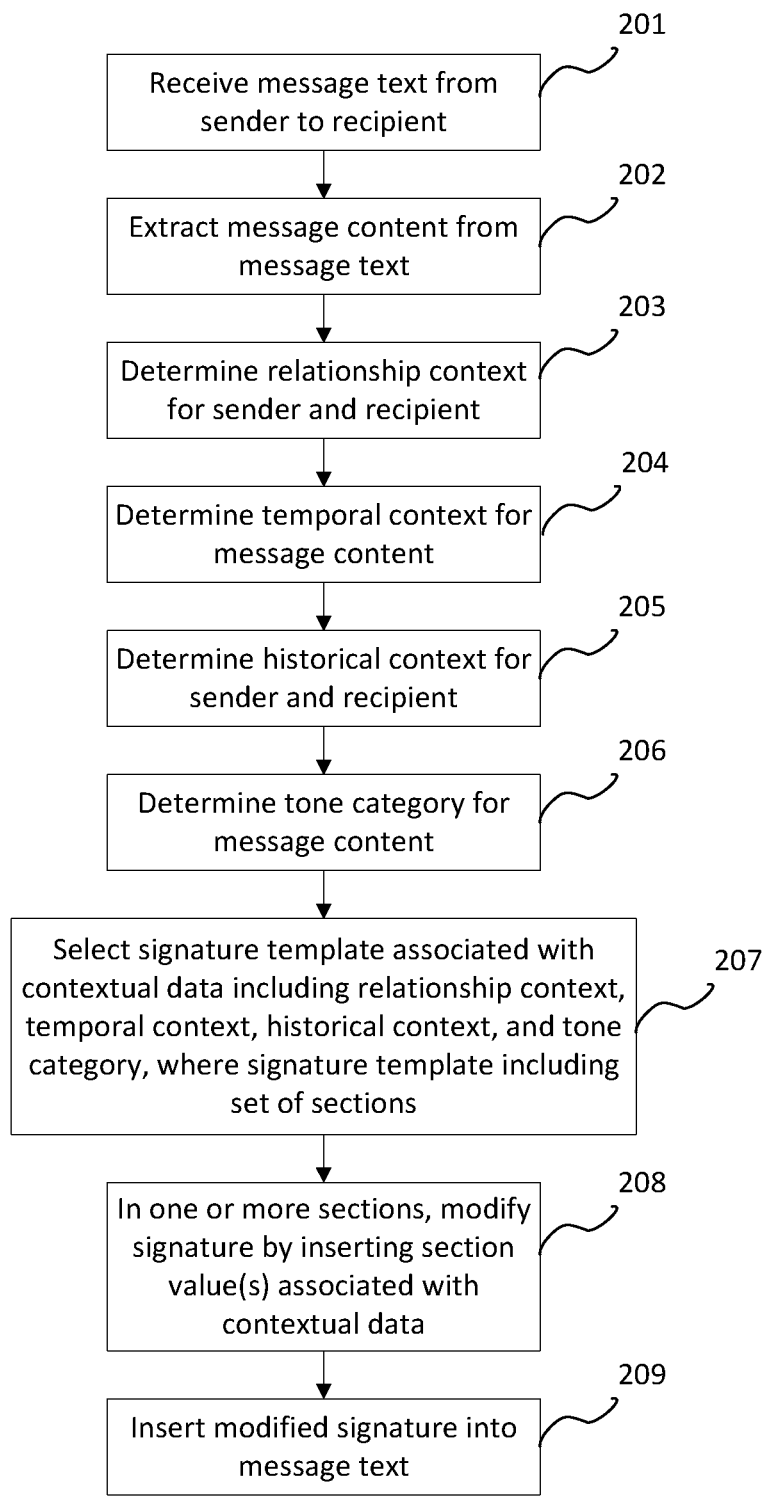
FIG. 2 illustrates a process for automatic modification of message signatures using contextual data, according to embodiments of the present invention.

FIG. 2 illustrates a process for automatic modification of message signatures using contextual data, according to embodiments of the present invention. Referring to both FIGS. 1 and 2, the conversation client 101 receives a message text for a message from a sender to a recipient (201). For example, the conversation client 101 is an email client through which the sender types text into a body of an email addressed to one or more recipients. The conversation client 101 sends the message text, and optionally the message metadata, to the context analyzer 102. The message metadata could include the date and time of the message, a timestamp of the message, and/or a time zone of the message. The message metadata contains additional information that can accompany a message to give the message meaning beyond the message content. The contents of the message metadata vary by medium, whether it is email, forum, chat, or a group chat. Some further examples of this metadata include subject, reply to, expiration, restrictions, owner of the thread, last responder of a thread, last Message Id in the conversation, etc. The context analyzer 102 extracts the message content from the message text (202), for example, by using natural language processing. The context analyzer 102 then calls the relationship analyzer 103, the temporal context analyzer 104, the historical context analyzer 105, and the tone analyzer 106 and passes the message content to these components. Using at least the message content, the relationship analyzer 103 determines a relationship context capturing the nature of the relationship between the sender and the recipient (203) and returns the relationship context to the context analyzer 102. For example, the relationship context can be 'professional', 'personal', 'manager', 'leader', 'colleague', or 'peer', etc. In some embodiments, terms in the message content indicates which relationship context is appropriate for the sender and recipient. If the message content is part of a conversation thread, then the content of the other messages in the conversation thread can also be used to determine the relationship context.

The temporal content analyzer 104 determines the temporal context for the message content (204) and returns the temporal context to the context analyzer 102. The temporal context captures the temporal features of the message content. In some embodiments, the message content includes temporal terms such as a meeting 'today', 'tomorrow', 'next week', etc. Further, the temporal context can be determined from the message metadata, such as from the timestamp, current time, and/or time zone. The temporal context can also be determined from the correlation between the temporal features in the message content and events or activities of a user that has time associations. The historical context analyzer 105 determines the historical context for the sender and recipient (205). The historical context captures the nature of a history of electronic conversations between the sender and the recipient. The historical context indicates the metes and bounds of interactions between the sender and recipient over time. In some embodiments, the temporal context and the historical contexts are sent to the relationship analyzer 103 to be used to determine the relationship context. For example, a periodic systematic daily thread and frequent steady meetings indicate a more personal or engaged relationship, even if it is in the business context, and indicate some level of familiarity with the relationship. In response, the relationship analyzer 103 would adjust the relationship context's personal or familiarity level higher.

The tone analyzer 106 determines a tone category for the message content (206) and returns the tone category to the context analyzer 102. The tone category captures a primary tone, and strength of the primary tone, of the message content. For example, the tone category can be 'angry', 'happy', 'sad', 'confident', etc. The context analyzer 102 then sends the message content and the contextual data, including some combination of the relationship context, the temporal context, the historical context, and the tone category, to the signature producer 107. The signature producer 107 is configured with access to the mapping database 108 and the template repository 109. The signature producer 107 selects a signature template from the template repository 109 associated with the contextual data (207). The signature template includes a set of sections where content can be inserted to dynamically modify the signature. The signature producer 107 then modifies the signature by mapping, in one or more of the set of sections, a section value associated with the contextual data (208). The association between the section value(s) and the contextual data are stored in the entries of the mapping database 108. In some embodiments, not all sections have associated values for the contextual data, and a section without an associated value is ignored or the signature is further modified to remove the signature content associated with this section. The signature producer 107 sends the modified signature to the conversation client 101. The conversation client 101 inserts the modified signature into the message text (209). Optionally, the conversation client 101 gives the sender an option to accept or reject the modified signature. If the sender rejects the modified signature, then the modified signature is not inserted or is removed after insertion. Optionally, a default signature is inserted into the message text instead.

In some embodiments, the determination of contextual data and the modification of the signature occurs automatically, without user intervention. The process instead is initiated by the input of the message text by the sender at the conversation client 101 or some other event indicating that a message to be sent is being or has been composed. Unlike other processes, the modification of the signature is not based on rules configured by a user and/or not reliant on information configured by the user.

Figure 3:
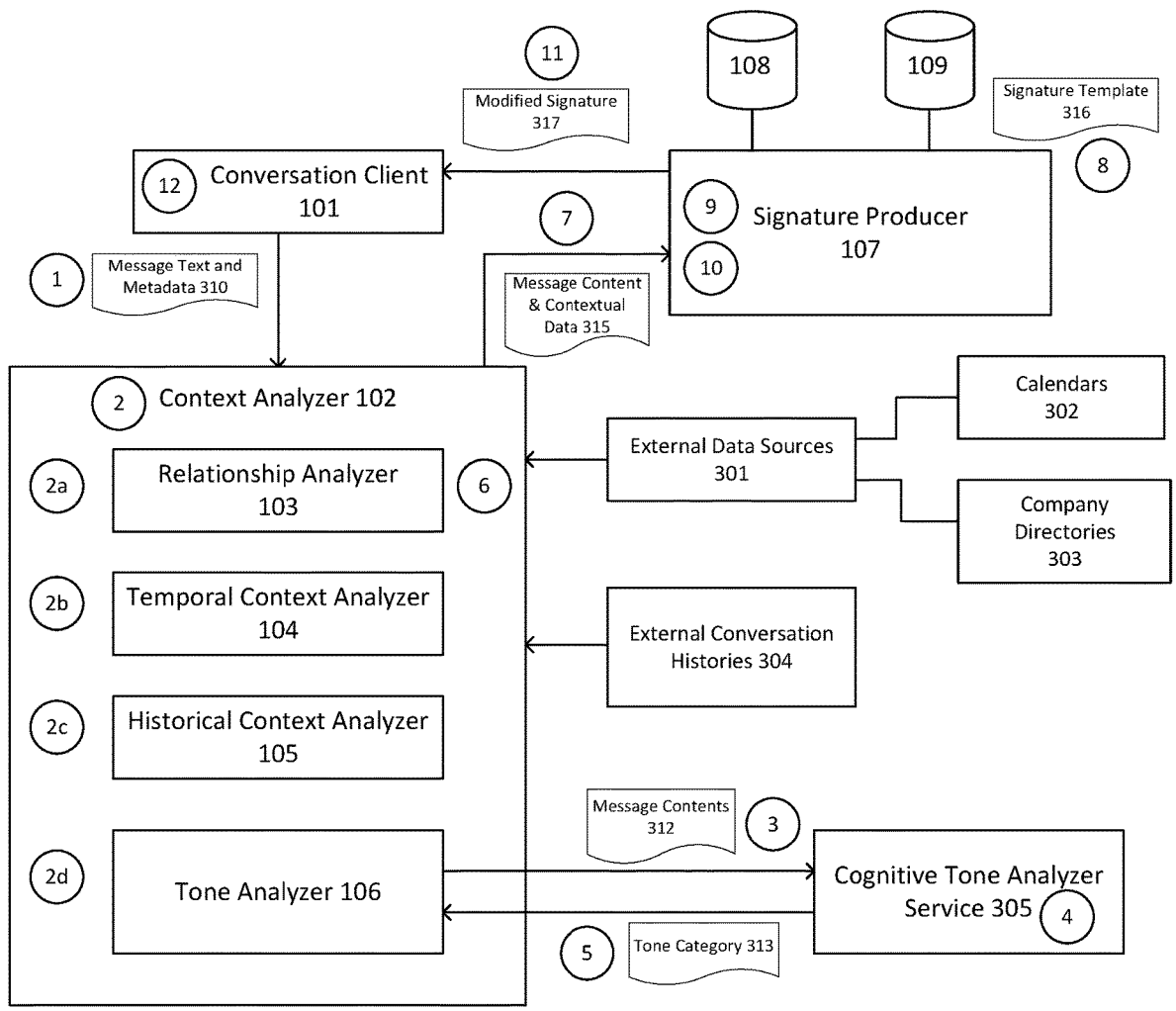
FIG. 3 illustrates in more detail the process flow in the automatic modification of message signatures using contextual data, according to embodiments of the present invention.

FIG. 3 illustrates in more detail the process flow in the automatic modification of message signatures using contextual data, according to embodiments of the present invention. In some embodiments, when a sender begins inputting text into the body of an electronic message, the conversation client 101 initiates the dynamic signature modification process. The conversation client 101 sends the message text and metadata 310 to the content analyzer 102 (1). The message text can be sent as the sender inputs the text, such as sending each line of text as it is input. The context analyzer 102 extracts the message content from the message text using natural language processing (2). The context analyzer 102 calls the relationship analyzer 103, the temporal context analyzer 104, the historical context analyzer 105, and the tone analyzer 106 and passes at least the message content.

The relationship analyzer 103 analyzes the message content and determines the relationship between the sender and the recipient of the message (2a). To determine the relationship context, the relationship analyzer 103 mines the message content for indications of the relationship between the sender and recipient. For example, when the message content indicates that the relationship between the sender and recipient is professional, the message content can by further mined to further determine the nature of the professional relationship, e.g. whether the sender and the recipient work in the same company or different companies by examining the e-mail addresses of the sender and recipient. When the sender and recipient work for different companies, the relationship analyzer 103 determines from the message content whether the recipient is a client, a colleague, or a mentor, etc. When the sender and recipient work for the same company, the relationship analyzer 103 can optionally use an external data source 301 to further determine the nature of their relationship. For example, a company directory 303 is accessed to mine an organization chart, job descriptions, professional profiles, etc. When the message content indicates that the relationship is personal, the message content can be further mined to determine whether the nature of the personal relationship is family, close friends, or casual acquaintances, etc. External sources, such as social media profiles to which the relationship analyzer 103 has permission to access, can be mined to further determine the nature of the personal relationship.

The temporal context analyzer 104 determines the temporal context of the message content (2b). The temporal context can be based on temporal terms in the message content, temporal terms in the conversation thread to which the message content belongs, temporal terms in external conversation histories 304 between the sender and recipient, frequency of conversations between the sender and recipient, and/or the progression of conversations between the sender and recipient. Optionally, users can give permission for the context analyzer 102 to access their calendars 302, allowing the temporal context analyzer 104 to mine calendar data for temporal data relevant to the message content.

The historical context analyzer 105 determines a historical context based on a history of conversations between the sender and recipient (2c). When the message content is part of a conversation thread, all or part of the messages in the conversation thread may be analyzed by the historical context analyzer 105. When users give permission for the context analyzer 102 to access other platforms, external conversation histories 304 on these other platforms may also be considered by the historical context analyzer 105. The historical context can include a cultural context capturing a primary culture associated with the recipient. For example, the conversation histories show that the recipient mostly concludes messages with 'Ciao', indicating an Italian cultural context for the recipient.

The context analyzer 102 also calls the tone analyzer 106 and passes the message content, optionally with the conversation thread in which it belongs and any external conversation histories 311. The tone analyzer 106 sends the message content to a cognitive tone analyzer service 205 (3). The cognitive tone analyzer service 205 analyzes the message content, attributes a primary tone for the message content, and determines a tone category for the primary tone and a strength of the primary tone. In some embodiments, the writing pattern in the message content is also analyzed in determining the primary tone. The tone category 313 is returned to the tone analyzer 106 (5). The tone analyzer 106 returns the tone category 313 to the context analyzer 102 (2d). Optionally, the tone category 313 is passed to the relationship analyzer 103, which uses the tone category 313 to refine the relationship context (6). The context analyzer 102 sends the message content and contextual data 315 to the signature producer 107 (7). The contextual data includes at least the relationship context, the temporal context, the historical context, and the tone category.

The signature producer 107 selects a signature template 316 from the template repository 109 that matches the contextual data (8). In some embodiments, the contextual data is mapped to templates based on a correlation between the number of definitive contexts in the contextual data and the fields and options in the templates. In some embodiments, the contextual data is mapped to the templates by matching each template section associated with a context type with the existence of that type of context in the contextual data. For example, a temporal context for a temporal occasion can map to a section that has closing options with temporal features or have suffixes that are temporal in nature, e.g. "Ciao, see you tomorrow". The signature template 316 includes a set of sections, such as name, title, address, URL, message opening, message closing, etc. For each section, the signature producer 107 searches the mapping database 108 for a matching combination of the contextual data and extracts a value associated with the matching combination (9). In some embodiments, the signature producer 107 scores the contextual data to weigh the contexts and uses the scored contextual data to search the mapping database. In some embodiments, degrees of responses may be available in the mapping database 108 for familiarity with the recipient, and a choice between a set of values are based on the weighting applied to the contexts. For example, for a value for a closing, a scale of 1-10 can be used for the weighted contexts, and the mapping database 108 will have different values for the closing applied to different tiers on the scale. In some embodiments, the tone category 313 and a confidence score output by the tone analyzer 106 are used to map a message opening value to a message opening section in the template. For example, for a high confidence score with a tone category of angry and frustrated may map to a very apologetic message opening value from the mapping database 108. The signature producer 107 then modifies the signature by mapping the value to the appropriate section in the signature template (10). For example, based on the combination of contexts in the contextual data, the name in the signature can be changed from a less formal to a more formal name. Similarly, the title in the signature can be changed to match the role of the sender and the tone in the conversation. Based on the temporal context and the historical context, a score for the likelihood that the recipient will communicate with the sender in the future is calculated and the amount of contact information in the signature is modified accordingly. Based on the relationship and historical contexts, links in the signature are modified by removing one or more links or selecting the appropriate links. Based on the tone category and the temporal context, a type of response in relation to the time left for the next interaction is determined and the signature is adjusted accordingly. The modified signature 317 is then sent to the conversation client 101 (11). The conversation client 101 inserts the modified signature 317 into the message text (12).

Examples of signature modifications include:
message section maps to "Cheers" for an informal relationship with a recipient located in Dublin, Ireland on a message with a playful tone;
message section maps to "Ciao" for a professional relationship with a recipient located in Italy who is a superior of the sender;
message section maps to "Sincerely" for a formal relationship with a recipient higher than the sender in an organizational hierarchy and on a message that has a contentious tone;
message section maps to "See you next week" for an informal relationship with a recipient with which the sender has an upcoming meeting, indicated on the sender's calendar;
message section maps to "Thanks" for a relationship with a recipient with whom the sender has not yet met;
message section maps to "Thanks, First Name" for an informal relationship on a succinct message with no greeting text;
message section maps to "Thanks, First Name Last Name" for a recipient with whom the sender is not familiar, where the recipient is located in a country where it is culturally rude to address an unfamiliar person by their first name only;
message section maps to "Happy Holidays" for an informal relationship with a recipient celebrating a cultural holiday on a message whose content is not work-related;
a URL section is removed for a message where the recipient is a landlord of the sender;
for a recipient with whom the sender is interacting as the sender's role as Y, information in a message section related to the sender's role as X is removed;
the sender is determined to be out of her home country at the time the message is composed, and the information only relevant to her home country is removed from message sections;

the sender has a personal relationship with the recipient, and the sender's personal email address is included in the signature;

the recipient is a client with whom the sender does not know well, and a link to the sender's profile or credentials is included in the signature;

the message content has an angry tone, and the sender's phone number is excluded from the signature;

the message content has a happy tone and the recipient is a family member, and the sender's links to social media posts are included in the signature; and the recipient is from the sender's alma mater whom the sender does not know well, and the sender's degree and graduating year is included in the signature.

In some embodiments, when the sender's message is directed to a plurality of recipients, the contextual data may be determined for the primary recipient to which the message is addressed. For example, the email address in the "To" line of an email may be used to identify the primary recipient or the recipient mentioned in the opening may be used. The signature is then modified for the primary recipient.

The context analyzer 102 may be local to the conversation client 101 or located on the same computing device. Alternatively, the conversation client 101 may communicate with the context analyzer 102 over a network (not shown). For example, the conversation client 101 may be a web-based application. Similarly, the tone analyzer 106 and/or the signature producer 107 may be local to the conversation client 101 or located over a network.

Figure 4:
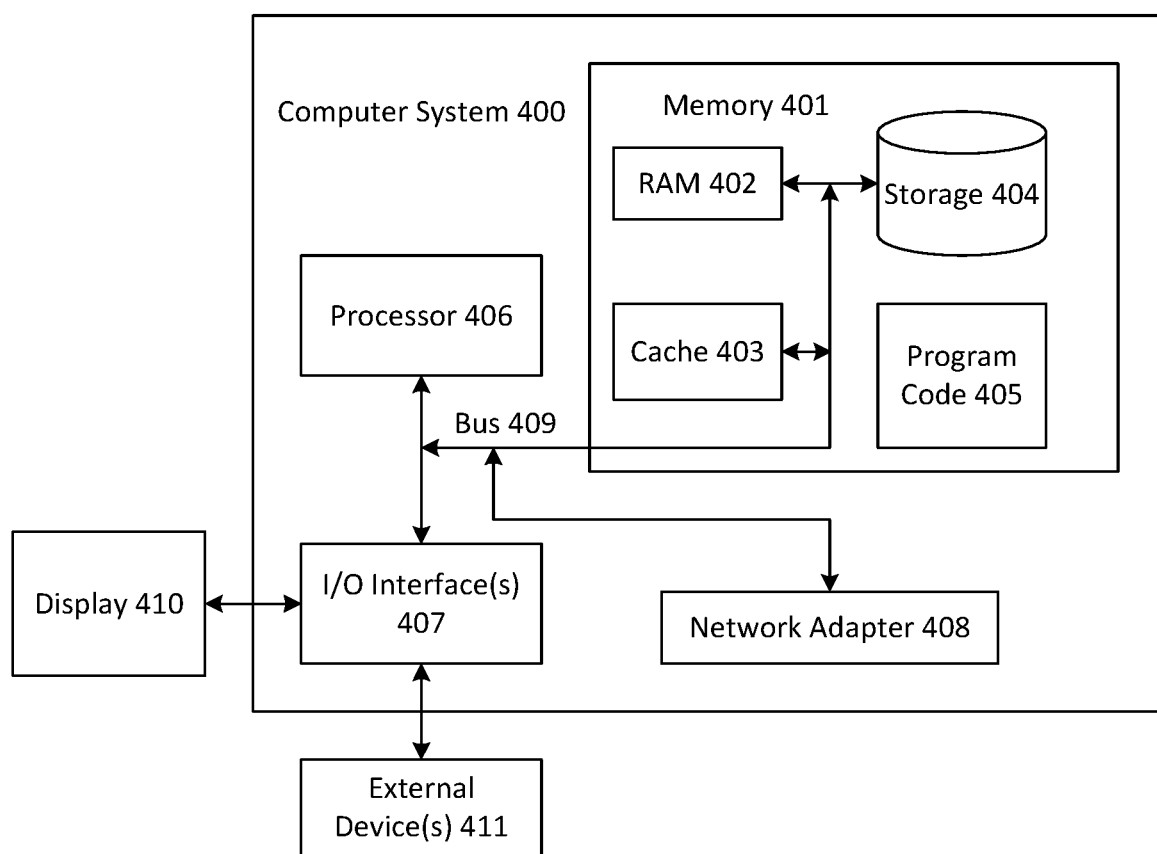
FIG. 4 illustrates a computer system, one or more of which implements the system for automatic modification of message signatures using contextual data according to embodiments of the present invention.

FIG. 4 illustrates a computer system, one or more of which implements the system for automatic modification of message signatures using contextual data according to embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 100 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a processor; and
   a computer readable storage medium having program instructions embodied therewith, the program instructions executable by the processor to cause the processor to:
   receive message text for an electronic message from a sender to a recipient;
   extract message content from the message text;
   using at least the message content, determine a relationship context for the sender and the recipient, the relationship context capturing a nature of the relationship between the sender and the recipient;
   using at least the message content, determine a temporal context for the message content, the temporal context capturing temporal features of the message content;
   using at least the message content and a history of electronic conversations between the user and the recipient, determine a historical context for the sender and the recipient, the historical context capturing a nature of electronic interactions between the sender and the recipient over time;
   using at least the message content, determine a tone category for the message content, the tone category capturing a primary tone and strength of the primary tone of the message content;
   select a signature template of a plurality of signature templates in a template repository mapped to a combination of contextual data matching the relationship context, the temporal context, the historical context, and the tone category, the signature template comprising a set of sections;
   for each section of the set of sections, search a mapping database for an entry matching the combination of the contextual data, the entry comprising a section value associated with the combination of the contextual data;
   for each section of the set of sections, extract a corresponding section value from the entry;
   modify a signature for the electronic message by inserting the section value corresponding to each section of the set of sections in the signature template; and
   insert the modified signature into the message text.

2. The system of claim 1, wherein the relationship context is determined using at least the message content and messages in a conversation thread to which the message content belong.

3. The system of claim 1, wherein the historical context comprises a cultural context capturing a primary culture associated with the recipient.

4. The system of claim 1, wherein the processor is further caused to:
   refine the relationship context using the historical context or the tone category.

5. The system of claim 1, wherein the message text is directed to a plurality of recipients, wherein the processor is further caused to:
   determine a primary recipient of the message text;
   determine the relationship context for the sender and the primary recipient; and
   determine a historical context for the sender and the primary recipient.

6. A method for automatic modification of a signature for an electronic message using contextual data, implemented by a processor, comprising:
   receiving, by a contextual analyzer from a conversation client, message text for the electronic message from a sender to a recipient;
   extracting, by the contextual analyzer, message content from the message text;
   using at least the message content, determining, by a relationship analyzer, a relationship context for the sender and the recipient, the relationship context capturing a nature of the relationship between the sender and the recipient;

using at least the message content, determining, by a temporal context analyzer, a temporal context for the message content, the temporal context capturing temporal features of the message content;

using at least the message content and a history of electronic conversations between the user and the recipient, determining, by a historical context analyzer, a historical context for the sender and the recipient, the historical context capturing a nature of electronic interactions between the sender and the recipient over time;

using at least the message content, determining, by a tone analyzer, a tone category for the message content, the tone category capturing a primary tone and strength of the primary tone of the message content;

selecting, by a signature producer, a signature template of a plurality of signature templates in a template repository mapped to a combination of contextual data matching the relationship context, the temporal context, the historical context, and the tone category, the signature template comprising a set of sections;

for each section of the set of sections, searching, by the signature producer, a mapping database for an entry matching the combination of the contextual data, the entry comprising a section value associated with the combination of the contextual data;

for each section of the set of sections, extracting, by the signature producer, a corresponding section value from the entry;

modifying, by the signature producer, a signature for the electronic message by inserting the section value corresponding to each section of the set of sections in the signature template; and inserting, by the signature producer, the modified signature into the message text.

7. The method of claim 6, wherein the relationship context is determined using at least the message content and messages in a conversation thread to which the message content belong.

8. The method of claim 6, wherein the historical context comprises a cultural context capturing a primary culture associated with the recipient.

9. The method of claim 6, further comprising:

refining, by the relationship analyzer, the relationship context using the historical context or the tone category.

10. The method of claim 6, wherein the message text is directed to a plurality of recipients, wherein the method further comprises:

determining a primary recipient of the message text;

determining the relationship context for the sender and the primary recipient; and determining a historical context for the sender and the primary recipient.

11. A computer program product for automatic modification of a signature for an electronic message using contextual data, the computer program product comprising a computer readable storage medium having program instructions embodied therewith, the program instructions executable by a processor to cause the processor to:

receive message text for an electronic message from a sender to a recipient;

extract message content from the message text;

using at least the message content, determine a relationship context for the sender and the recipient, the relationship context capturing a nature of the relationship between the sender and the recipient;

using at least the message content, determine a temporal context for the message content, the temporal context capturing temporal features of the message content;

using at least the message content and a history of electronic conversations between the user and the recipient, determine a historical context for the sender and the recipient, the historical context capturing a nature of electronic interactions between the sender and the recipient over time;

using at least the message content, determine a tone category for the message content, the tone category capturing a primary tone and strength of the primary tone of the message content;

select a signature template of a plurality of signature templates in a template repository mapped to a combination of contextual data matching the relationship context, the temporal context, the historical context, and the tone category, the signature template comprising a set of sections;

for each section of the set of sections, search a mapping database for an entry matching the combination of the contextual data, the entry comprising a section value associated with the combination of the contextual data;

for each section of the set of sections, extract a corresponding section value from the entry;

modify a signature for the electronic message by inserting the section value corresponding to each section of the set of sections in the signature template; and insert the modified signature into the message text.

12. The computer program product of claim 11, wherein the relationship context is determined using at least the message content and messages in a conversation thread to which the message content belong.

13. The computer program product of claim 11, wherein the processor is further caused to:

refine the relationship context using the historical context or the tone category.

14. The computer program product of claim 11, wherein the message text is directed to a plurality of recipients, wherein the processor is further caused to:

determine a primary recipient of the message text;

determine the relationship context for the sender and the primary recipient; and determine a historical context for the sender and the primary recipient.

* * * * *